(12) United States Patent
Nagaoka et al.

(10) Patent No.: US 6,943,522 B2
(45) Date of Patent: Sep. 13, 2005

(54) SERVO CONTROLLER

(75) Inventors: Kotaro Nagaoka, Tokyo (JP); Tomonori Sato, Tokyo (JP); Hidetoshi Ikeda, Tokyo (JP); Teiji Takahashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/775,253

(22) Filed: Feb. 11, 2004

(65) Prior Publication Data

US 2004/0183494 A1 Sep. 23, 2004

(30) Foreign Application Priority Data

Feb. 20, 2003 (JP) .................................... 2003-042916
Dec. 16, 2003 (JP) .................................... 2003-418459

(51) Int. Cl.[7] .............................................. G05D 3/12
(52) U.S. Cl. ..................... 318/632; 318/548; 318/560
(58) Field of Search ............................... 318/548–560, 318/607–632, 568.14; 700/42

(56) References Cited

U.S. PATENT DOCUMENTS

| | | | | |
|---|---|---|---|---|
| 4,603,284 A | * | 7/1986 | Perzley ................... | 318/568.14 |
| 5,107,193 A | | 4/1992 | Iwashita | |
| 5,623,402 A | * | 4/1997 | Johnson ....................... | 700/42 |
| 5,646,492 A | | 7/1997 | Nagano et al. | |
| 5,652,491 A | * | 7/1997 | Ikawa et al. ................. | 318/632 |
| 5,952,804 A | * | 9/1999 | Hamamura et al. .......... | 318/560 |
| 6,274,994 B2 | * | 8/2001 | Tsutsui ........................ | 318/560 |
| 6,633,050 B1 | * | 10/2003 | Lyons ......................... | 250/548 |
| 6,864,962 B2 | * | 3/2005 | Morisada ..................... | 355/73 |
| 2001/0002097 A1 | * | 5/2001 | Tsutsui ........................ | 318/560 |
| 2002/0140921 A1 | * | 10/2002 | Morisada ..................... | 355/73 |
| 2003/0184251 A1 | * | 10/2003 | Oyama et al. ............... | 318/607 |

FOREIGN PATENT DOCUMENTS

| | | |
|---|---|---|
| JP | 03-015911 | 1/1991 |
| JP | 2000-092882 | 3/2000 |

* cited by examiner

*Primary Examiner*—Paul Ip
(74) *Attorney, Agent, or Firm*—Leydig, Voit & Mayer, Ltd.

(57) ABSTRACT

A servo controller includes a mechanical characteristic compensation unit for attenuating components having predetermined frequencies and corresponding to characteristics of a machine, which are included in a position instruction signal corrected by a finite impulse response (FIR) filter, and computing feed-forward signals respectively associated with position, speed, and torque of the machine, and a feedback compensation unit for driving the machine according to the feed-forward signals. Therefore, the servo controller can reduce vibrations that originate from the characteristics of the machine. In addition, because the FIR filter can easily make the response path with respect to a symmetrical instructed path, become symmetrical, when the machine is made to travel between two positions along the same path, the two response paths of the round trip match each other, so machined surfaces having no irregularities can be provided when performing reciprocating machining.

12 Claims, 11 Drawing Sheets

FIG.1

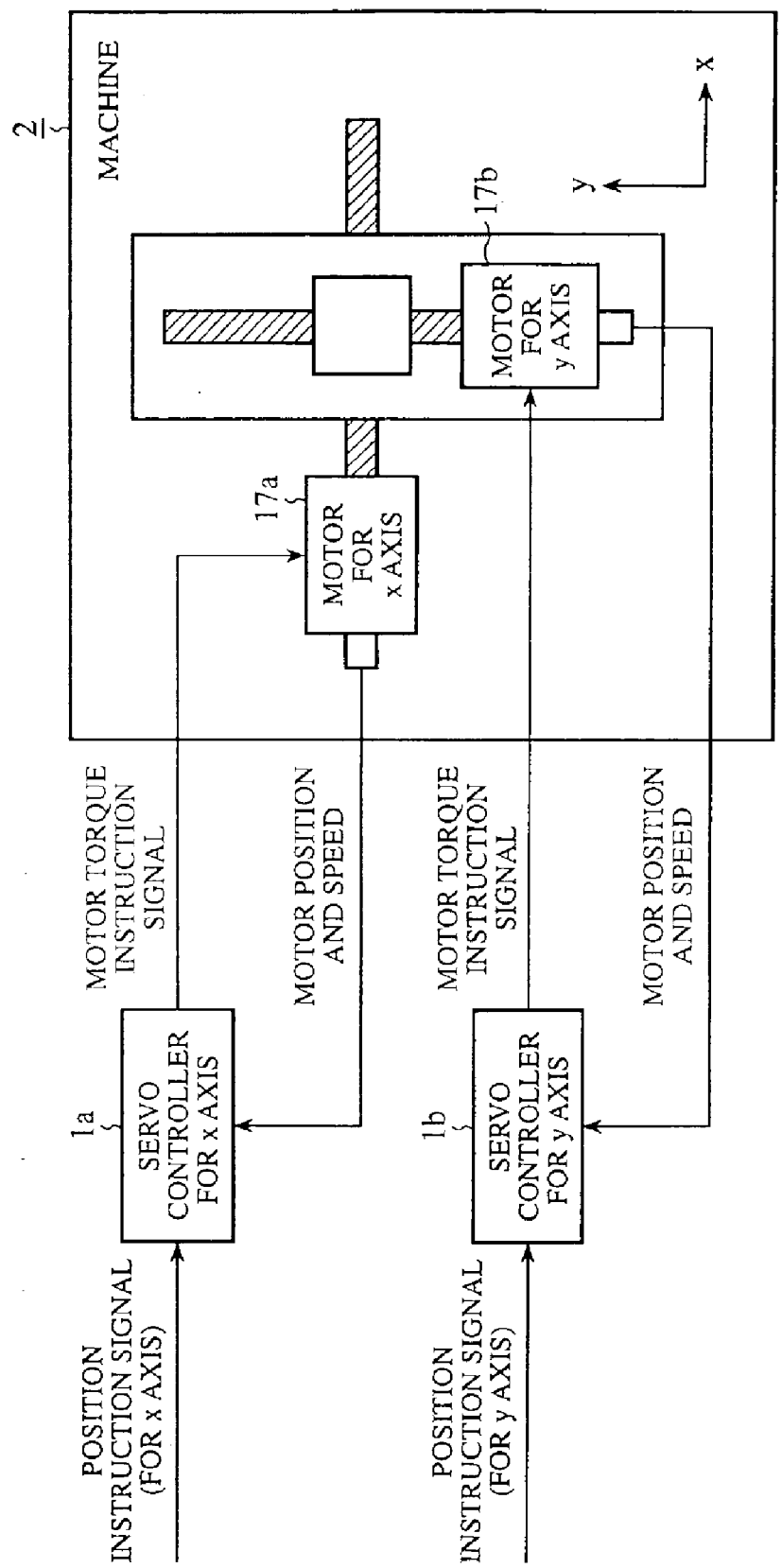

GAIN CURVE

SERVO CONTROLLER

BACKGROUND OF THE INVENTION

1. Field of the Invention

The present invention relates to a servo controller for driving a load machine, such as a feed shaft for use with a machining tool or an arm for use with an industrial robot, by using a motor. More particularly, it relates to a servo controller for performing path control on a machine having two or more axes.

2. Description of Related Art

There have been provided prior art servo controllers for carrying out feed forward control so as to compensate for a delay in response to an instructed value of an amount to be controlled such as the position or speed of a target machine. For example, Japanese patent publication No. 2762364 (reference 1) discloses a servo controller for differentiating a position instruction signal so as to obtain an amount of feed forward control associated with the position of a target machine, for adding the amount of feed forward control to an amount of control acquired by carrying out position loop control so as to obtain a speed instruction signal, for adding an amount of feed forward control associated with the speed of the target machine, which is obtained by differentiating the amount of feed forward control associated with the position of the target machine, to a value acquired by carrying out speed loop control so as to obtain an electric current instruction signal, and for performing servo control, thereby improving the response of position control (see FIG. 1 of Japanese patent publication No. 2762364, for example).

Japanese patent application publication (TOKKAI) No. 2000-92882 (reference 2) discloses a servo controller in which a simulated control circuit is so constructed as to control a mechanical system model which is approximated as a two-inertia oscillation system and is provided with a torque transmission mechanism, a load machine, and an electric motor, and to add the position, speed, and torque of a simulated electric motor of the simulated control circuit to a value acquired, as an amount of feed forward control, by carrying out position loop control and speed loop control, thereby improving the response of position control without exciting vibrations even when the stiffness of the target to be controlled is low and the target to be controlled has resonance characteristics (see FIG. 25 of Japanese patent application publication (TOKKAI) No. 2000-92882, for example).

A problem with the prior art servo controller disclosed in Japanese patent publication No. 2762364 is that while the prior art servo controller can offer adequate performance when the stiffness of the target to be controlled is high and the target to be controlled can be assumed to be a rigid body, mechanical resonance vibrations can cause vibrations in the position and speed of the target to be controlled, which are amounts to be controlled, when the prior art servo controller is applied to a target to be controlled having low stiffness and resonance characteristics and the response of position control is increased, the positioning accuracy and path tracking accuracy decrease, as shown in FIG. 13.

A problem with the other prior art servo controller disclosed in Japanese patent application publication (TOKKAI) No. 2000-92882 is that when the target to be controlled can be assumed to be a two-inertia oscillation system, while the position of the target to be controlled completely responds to the position of the simulated control circuit at all times and therefore the response of the position control can be improved without exciting vibrations, the simulated control circuit constitutes a feedback control system and therefore the impulse response is not made to become symmetric. As a result, the response path of the target to be controlled does not become symmetric even if a symmetric path is provided as the instructed path, and therefore, when the target to be controlled is instructed to travel between two positions along the same instructed path so that the direction of travel is changed as shown in FIG. 14, a difference can occur between the two response paths of the round trip. This results in the generation of scratches on a machined surface of a mold when the mold is machined with reciprocating machining.

SUMMARY OF THE INVENTION

The present invention is proposed to solve the above-mentioned problems, and it is therefore an object of the present invention to provide a servo controller that can reduce vibrations that originate from mechanical characteristics, and that can make the two response paths of a round trip of a target to be controlled match each other.

In accordance with the present invention, there is provided a servo controller including a mechanical characteristic compensation unit for attenuating components each having a predetermined frequency and each corresponding to a characteristic of a target machine to be driven, which are included in a position instruction signal corrected by an FIR filter unit, so as to compute a plurality of feed-forward signals respectively associated with the position, speed and torque of the target machine, and a feedback compensation unit for driving the target machine to be driven according to the plurality of feed-forward signals respectively associated with the position, speed and torque of the target machine.

Because the mechanical characteristic compensation unit thus attenuates components each having a predetermined frequency and each corresponding to a characteristic of the target machine to be driven, which are included in the position instruction signal, so as to compute the plurality of feed-forward signals respectively associated with the position, speed and torque of the target machine, the servo controller can reduce vibrations that originate from the characteristics of the machine. Furthermore, because the mechanical characteristic compensation unit delivers the computed feed-forward signals to the feedback compensation unit, the servo controller makes it possible for the position of the machine to respond completely to the input of the mechanical characteristic compensation unit, i.e., the output of the FIR filter unit. In addition, because the FIR filter unit can easily make the response path with respect to a symmetric instructed path become symmetric, and, when the target machine is made to travel between two positions along the same path, can make the two response paths of the round trip of the target machine match each other, the servo controller can provide machined surfaces having no irregularities even when carrying out reciprocating machining.

Further objects and advantages of the present invention will be apparent from the following description of the preferred embodiments of the invention as illustrated in the accompanying drawings.

BRIEF DESCRIPTION OF THE DRAWINGS

FIG. 3 is a block diagram showing the whole of the servo controller in accordance with embodiment 1 of the present invention;

DETAILED DESCRIPTION OF THE PREFERRED EMBODIMENTS

Embodiment 1.

Figure 1:
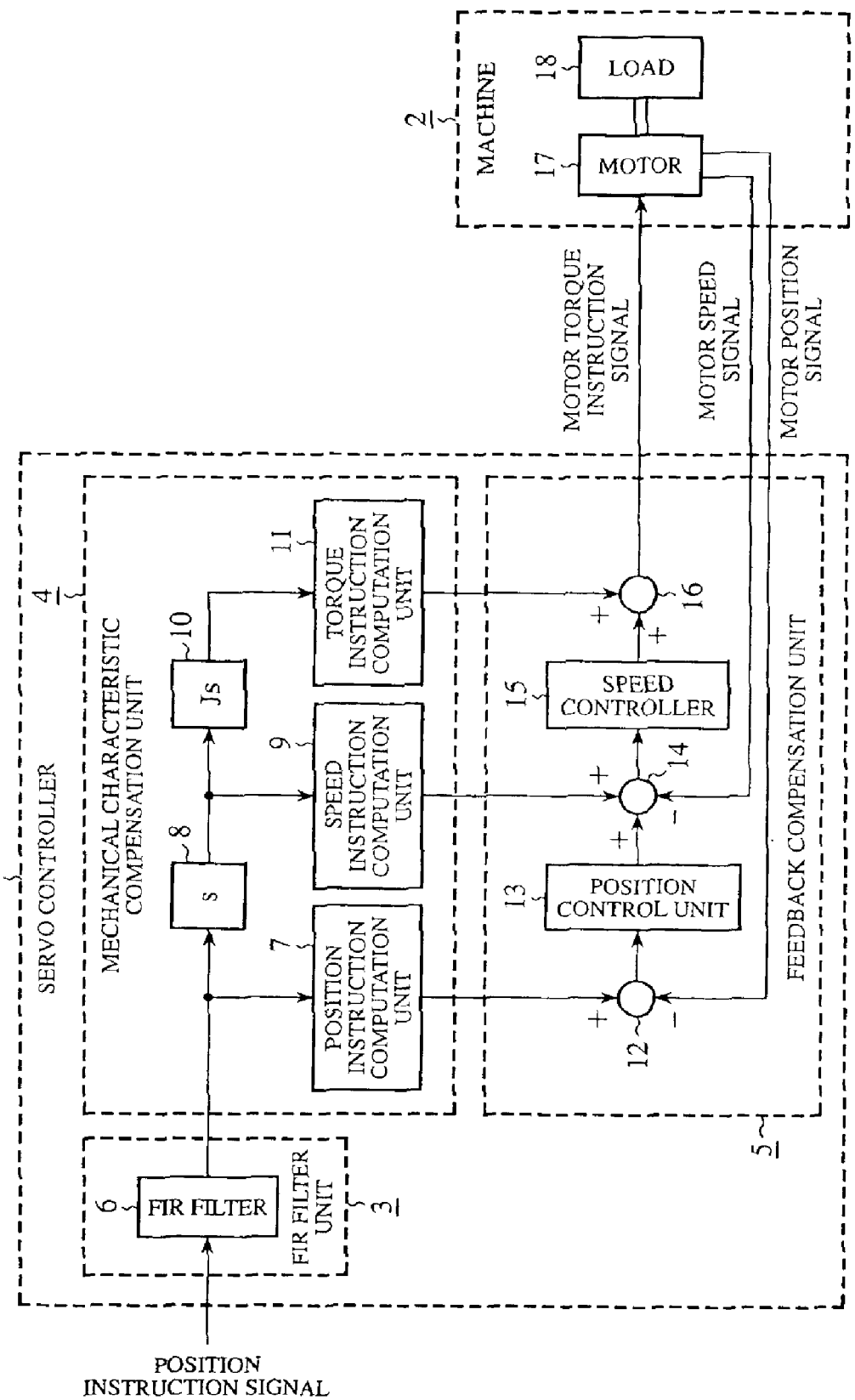
FIG. 1 is a block diagram showing a servo controller in accordance with embodiment 1 of the present invention.

FIG. 1 is a block diagram showing a servo controller in accordance with embodiment 1 of the present invention. The servo controller 1 shown in the figure drives and controls a machine 2 (i.e., a target machine to be driven) according to a position instruction signal. In the servo controller 1, an FIR (Finite Impulse Response) filter unit 3 makes a correction to the input position instruction signal, a mechanical characteristic compensation unit 4 attenuates components each having a predetermined frequency which corresponds to a characteristic of the machine 2, those components being included in the corrected position instruction signal, and computes a plurality of feed-forward signals respectively associated with the position, speed and torque of the machine 2, and a feedback compensation unit 5 drives the machine 2 according to the plurality of feed-forward signals respectively associated with the position, speed and torque of the machine 2. The FIR filter unit 3 is provided with an FIR filter 6.

In addition, in the mechanical characteristic compensation unit 4, a position instruction computation unit 7 attenuates a component having an antiresonance frequency of the machine 2, which is included in the position instruction signal, so as to compute a feed-forward signal associated with the position of the machine, a differentiator 8 differentiates the position instruction signal, a speed instruction computation unit 9 attenuates a component having the antiresonance frequency of the machine 2, which is included in the differentiated value computed by the differentiator 8, so as to compute a feed-forward signal associated with the speed of the machine, a computation unit 10 differentiates the differentiated value computed by the differentiator 8 and multiplies the differentiated result by the total inertia of the machine 2, a torque instruction computation unit 11 attenuates a component having a resonance frequency of the machine 2, which is included in a value computed by the computation unit 10, so as to compute a feed-forward signal associated with the torque of the machine.

In addition, in the feedback compensation unit 5, a subtractor 12 subtracts a motor position signal from the feed-forward signal associated with the position of the machine and delivers the subtraction result to a position control unit 13, the position control unit 13 acquires a speed control signal from the subtraction result from the subtractor 12, an adder/subtractor 14 adds the feed-forward signal associated with the speed of the machine to the speed control signal, subtracts a motor speed signal from the addition result, and delivers the subtraction result to a speed control unit 15, the speed control unit 15 acquires a torque control signal from the subtraction result from the adder/subtractor 14, and an adder 16 adds the feed-forward signal associated with the torque of the machine to the torque control signal from the speed control unit 15 and delivers the addition result to the machine 2 as a motor torque instruction signal. The machine 2 is provided with a motor 17 for driving a load 18 according to the motor torque instruction signal from the feedback compensation unit 5.

Next, a description will be made as to the operation of the servo controller in accordance with embodiment 1 of the present invention. In FIG. 1, the input position instruction signal is smoothed by the FIR filter 6 and is then delivered to the mechanical characteristic compensation unit 4. The FIR filter 6 is comprised of two or more moving average filters connected in series, each of them having a time constant of $T_f$. The time constant of a moving average filter is equivalent to a value that is obtained by multiplying the number of taps of the moving average filter by a sampling period. In addition, the time constant of $T_f$ is computed from requested path accuracy parameters so that a response path satisfies a requested degree of path accuracy by performing predetermined computations. The requested path accuracy parameters can be a corner sag when the target machine is made to pass through a corner (i.e., a distance between the response path and the corner's peak when the target machine approaches the corner's peak most), an amount of inward turning in an arc (i.e., an amount of decrease in the radius of the response path with respect to an instructed radius), and so on.

In the mechanical characteristic compensation unit 4, an input signal $x_{r1}$ applied to the mechanical characteristic compensation unit 4 is applied to the position instruction computation unit 7 first, and the position instruction computation unit 7 then computes a feed-forward signal $x_a$ associated with the position of the machine from the input signal $x_{r1}$. The position instruction computation unit 7 is a computation unit that attenuates and delivers a component having an antiresonance frequency $\omega_z$ of the machine 2, which is included in the input signal $x_{r1}$. A relationship between the input signal $x_{r1}$ and the output signal $x_a$ is given by the following equation (1), where s is a Laplacian operator.

$$x_a(s) = \left(1 + \frac{1}{\omega_z^2}s^2\right)x_{r1}(s) \tag{1}$$

The input signal $x_{r1}$ applied to the mechanical characteristic compensation unit 4 is further input to the speed instruction computation unit 9 after differentiated by the differentiator 8, and the speed instruction computation unit 9 then computes a feed-forward signal $v_a$ associated with the speed of the machine from the differentiated input signal $v_{r1}$. The speed instruction computation unit 9 is a computation unit that attenuates and delivers a component having an antiresonance frequency $\omega_z$ of the machine 2, which is included in the differentiated input signal $v_{r1}$. A relationship between the differentiated input signal $v_{r1}$ and the output signal $v_a$ is given by the following equation (2):

$$v_a(s) = \left(1 + \frac{1}{\omega_z^2}s^2\right)v_{r1}(s) \tag{2}$$

In addition, the output signal of the differentiator 8 is input to the torque instruction computation unit 11 after differentiated and then multiplied by the total inertia J of the machine 2 by the computation unit 10, and the torque instruction computation unit 11 then computes a feed-forward signal $\tau_a$ associated with the torque of the machine from the output of the computation unit 10. The total inertia J is the sum of the inertia of the motor 17 and the inertia of the load 18. The torque instruction computation unit 11 is a computation unit that attenuates and delivers a component having a resonance frequency $\omega_p$ of the machine 2, which is included in the input signal $\tau_{r1}$ applied thereto. A relationship between the input signal $\tau_{r1}$ and the output signal $\tau_a$ is given by the following equation (3):

$$\tau_a(s) = \left(1 + \frac{1}{\omega_p^2}s^2\right)\tau_{r1}(s) \tag{3}$$

Then, the feed-forward signal $x_a$ associated with the position of the machine, the feed-forward signal $v_a$ associated with the speed of the machine, and the feed-forward signal $\tau_a$ associated with the torque of the machine are input to the feedback compensation unit 5. In the feedback compensation unit 5, the subtractor 12 subtracts the motor position signal $x_m$ delivered thereto from the machine 2 from the feed-forward signal $x_a$ associated with the position of the machine and delivers the subtraction result to the position control unit 13, and the position control unit 13 determines a speed control signal $v_c$ from the subtraction result from the subtractor 12. Although the position control unit 13 can have any structure as long as the feedback control system becomes stable, a proportional controller or the like is generally used as the position control unit 13. The adder/subtractor 14 then subtracts the motor speed signal $v_m$ delivered thereto from the machine 2 from a value that is obtained by adding the feed-forward signal $v_a$ associated with the speed of the machine to the speed control signal $v_c$ from the position control unit 13, and delivers the subtraction result to the speed control unit 15. The speed control unit 15 then determines a torque control signal $\tau_c$ from the subtraction result. Although the speed control unit 15 can have any structure as long as the feedback control system becomes stable, a proportional integration controller or the like is generally used as the speed control unit 15. The adder 16 adds the feed-forward signal $\tau_a$ associated with the torque of the machine to the torque control signal $\tau_c$ from the speed control unit 15 and then delivers the addition result to the machine 2 as the motor torque instruction signal $\tau_m$. As a result, the motor 17 is driven by the motor torque instruction signal. In the machine 2, the motor 17 mounted on a motor mounting base is coupled with the load 18 by way of a torque transmission mechanism, and delivers both the motor position signal $x_m$ and the motor speed signal $v_m$ to the servo controller by using a rotation detector installed in the motor 17. The torque generated by the motor 17 can respond quickly to the motor torque instruction signal $\tau_m$ from the servo controller.

In the servo controller having the above-mentioned structure, because according to the vibration characteristics of the machine 2 the feed-forward signals respectively associated with the position, speed, and torque of the machine, which are appropriately computed so that the position of the load of the machine 2 responds completely to the input signal $x_{r1}$ applied to the mechanical characteristic compensation unit 4, are delivered to the feedback compensation unit 5, the load position $x_1$ responds completely to the input signal $x_{r1}$ applied to the mechanical characteristic compensation unit 4. This feature can be expressed by the following equation (4) showing a relationship between the motor torque instruction signal $\tau_m$ and the motor position $x_m$ when the machine 2 can be approximated as a two-inertia oscillation system.

$$x_m(s) = \frac{1}{Js^2} \frac{1 + \frac{1}{\omega_z^2}s^2}{1 + \frac{1}{\omega_p^2}s^2} \tau_m(s) \tag{4}$$

Furthermore, a relationship between the motor position $x_m$ and the load position $x_1$ is given by the following equation (5):

$$x_l(s) = \frac{1}{1 + \frac{1}{\omega_z^2}s^2} x_m(s) \tag{5}$$

In addition, a relationship between the motor speed $v_m$ and the motor position $x_m$ is given by the following equation (6):

$$v_m(s) = s \cdot x_m(s) \tag{6}$$

In addition, when the transfer functions of the position control unit 13 and the speed control unit 15 are represented by $C_p(s)$ and $C_v(s)$, respectively, a relationship between the input and output of the feedback compensation unit 5 is given by the following equation (7):

$$\tau_m(s) = C_v(s)(C_p(s)(x_a(s) - x_m(s)) + v_a(s)) + \tau_a(s) \tag{7}$$

In consideration of the equations (1) to (5) and the relationships shown by the equations (6) and (7), a relationship between the input signal $x_{r1}$ applied to the mechanical characteristic compensation unit 4 and the load position $x_1$ of the machine 2 in accordance with embodiment 1 is determined as being $x_1=x_{r1}$. In other words, the load position $x_1$ responds completely to the input signal $x_{r1}$ applied to the mechanical characteristic compensation unit 4. Therefore, the response characteristics of the machine 2 showing a response of the load position with respect to the instructed position is made to agree with the response characteristics of the FIR filter 6.

Figure 2:
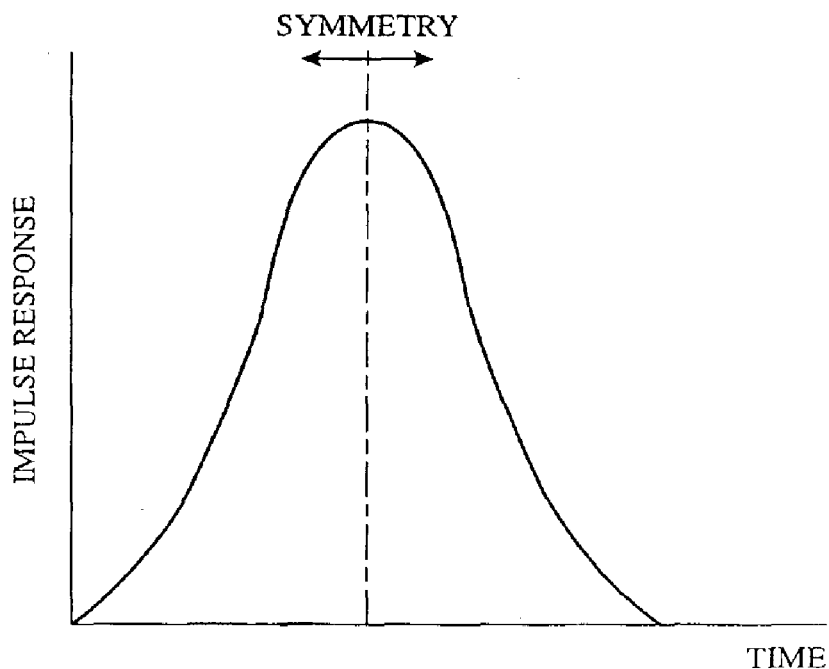
FIG. 2 is a diagram showing a symmetric impulse response.

FIG. 2 is a diagram showing a symmetric impulse response. When the FIR filter 6 exhibits an impulse response close to that as shown in FIG. 2, it is well known that a symmetric input applied to the FIR filter yields a symmetric output, and therefore a response path with respect to a symmetric instructed path becomes symmetric and go and return response paths have almost the same shape when the load of the machine is made to reciprocatingly move along the same path. In addition, when the FIR filter 6 has a completely symmetric impulse response, that is, when the FIR filter 6 is a linear phase FIR filter, the response path with respect to a symmetric instructed path becomes completely symmetric. Therefore, when the target to be driven is made to travel between two positions along the same path, the two response paths of the round trip of the target match each other. Furthermore, when the feed-forward signal τr1 associated with the torque of the machine contains the fourth or lower derivative of the input signal $x_{r1}$ applied to the mechanical characteristic compensation unit 4 and the input signal $x_{r1}$ applied to the mechanical characteristic compensation unit 4 is not smoothed sufficiently, it can be assumed that the feed-forward signal τr1 associated with the torque of the machine has an impulse, very large value and has a bad influence upon the machine 2. However, because the FIR filter 6 is composed of two or more moving average filters connected in series, when the position instruction signal $x_{r1}$ indicates an acceleration step instruction that is widely used for position control, the fourth derivative of the input signal $x_{r1}$ applied to the mechanical characteristic compensation unit 4 doesn't yield an impulse signal and therefore the feed-forward signal τr1 associated with the torque of the machine can be prevented from containing an impulse, very large component. Furthermore, because the FIR filter 6 has a completely symmetric impulse response, the response path with respect to a symmetric instructed path becomes completely symmetric, and therefore, when the target to be driven is made to travel between two positions along the same path, the two response paths of the round trip of the target machine match each other.

Figure 4:
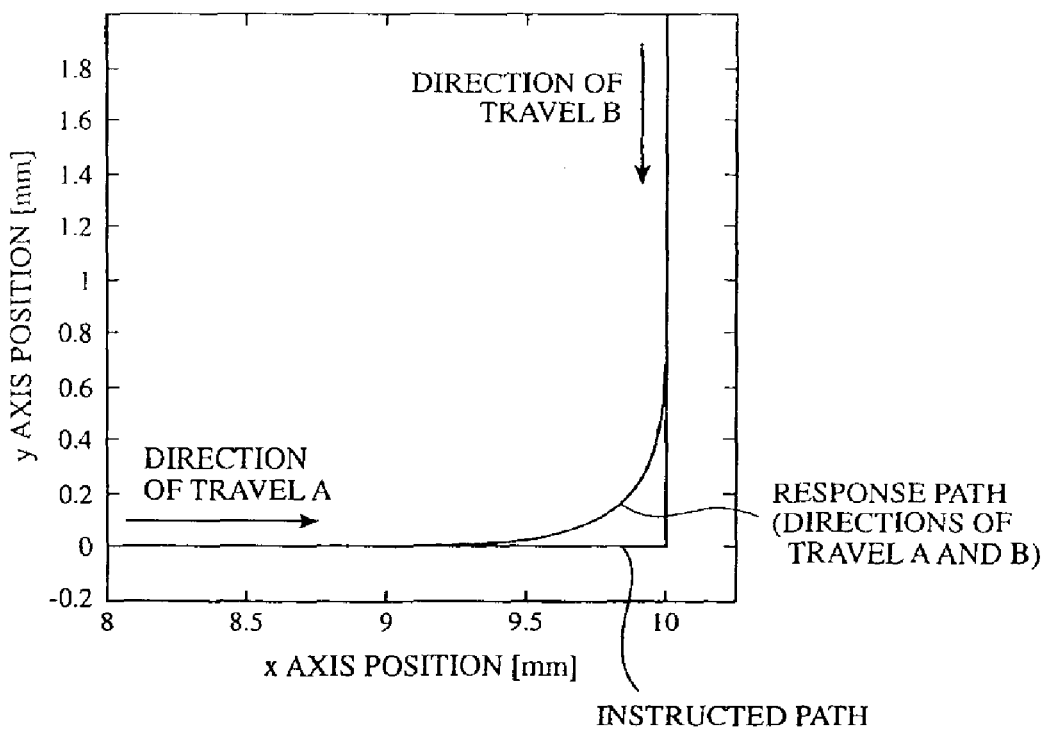
FIG. 4 is a diagram showing an instructed path that is provided for a target machine to be driven by the servo controller in accordance with embodiment 1 of the present invention, and a response path of the target machine to be driven.

It is preferable that the FIR filter 6 is a filter having a linear phase characteristic, such as a linear phase FIR filter. As an alternative, the FIR filter 6 can be a general FIR filter that doesn't have a linear phase characteristic. Because the output of such a general FIR filter is determined from a history of an input applied during a past finite time period, a symmetric response path can be provided easily as compared with the case of using another type of filter other than FIR filters, i.e., an IIR (Infinite Impulse Response) filter. A detailed explanation of FIR filters is made by "Introduction to Filter Circuits", by F. R. Connor (Morikita Suppan), for example. Next, advantages provided by the servo controller according to this embodiment 1 will be explained in simulation. FIG. 3 is a block diagram showing the whole of a system including two servo controllers in accordance with embodiment 1 of the present invention. As shown in the figure, an x-axis servo controller 1a and a y-axis servo controller 1b drive a machine 2 having two degrees of freedom (i.e., two axes of free motion) by using an x-axis motor 17a and a y-axis motor 17b. FIG. 4 is a diagram showing an instructed path that is provided for the target to be driven by the servo controller according to the embodiment 1 of the present invention, and a response path of the target to be driven. In the figure, the instructed path corresponds to the shape of a corner having an angle of 90 degrees, and the response path is provided when the target to be driven is made to move between two positions and in two directions of travel A and B along the same path. In this case, the resonance frequency $\omega_p$ of the machine 2 is 300 rad/s, and the antiresonance frequency $\omega_z$ of the machine 2 is 200 rad/s. It should be noted that in the example shown in FIG. 4, vibrations are further reduced in the response path as compared with the prior art case shown by the reference 1, and the difference between the response paths of the round trip is further reduced as compared with the prior art case shown by the reference 2. As a result, when machining a mold or the like with reciprocating machining, the servo controller system in accordance with embodiment 1 of the present invention can prevent scratches from being made on a machined surface of the mold.

As mentioned above, according to this embodiment 1, when the machine 2 can be assumed to be a two-inertia oscillation system and the attenuation characteristics of the machine 2 due to viscous friction can be neglected, the mechanical characteristic compensation unit 4 can determine feed-forward signals respectively associated with the position, speed, and torque of the machine 2 by using characteristic values of the machine 2 (e.g., the resonance frequency, antiresonance frequency, and total inertia of the machine), thereby reducing vibrations that originate from the characteristics of the machine 2.

Furthermore, by delivering the feed-forward signals acquired by the mechanical characteristic compensation unit 4 to the feedback compensation unit 5, the servo controller makes it possible for the position of the machine 2 to respond completely to the input of the mechanical characteristic compensation unit 4, i.e., the output of the FIR filter unit 3. In addition, because the FIR filter unit 3 can easily make the response path with respect to a symmetric instructed path become symmetric, and, when the target machine is made to travel between-two positions along the same path, can make the two response paths of the round trip of the target machine match each other, the servo controller can provide machined surfaces having no irregularities even when carrying out reciprocating machining.

In addition, because the FIR filter unit 3 is constructed of two or more moving average filters connected in series and the time constant of each moving average filter is set according to the requested path accuracy, the symmetry of the response path can be maintained and the signal input to the feedback compensation unit 5 can become an impulse signal having a large amplitude. As a result, it is possible to prevent large shock from being applied to the machine 2 and to make an error of the response path with respect to the instructed path fall within the requested path accuracy.

Embodiment 2.

Figure 5:
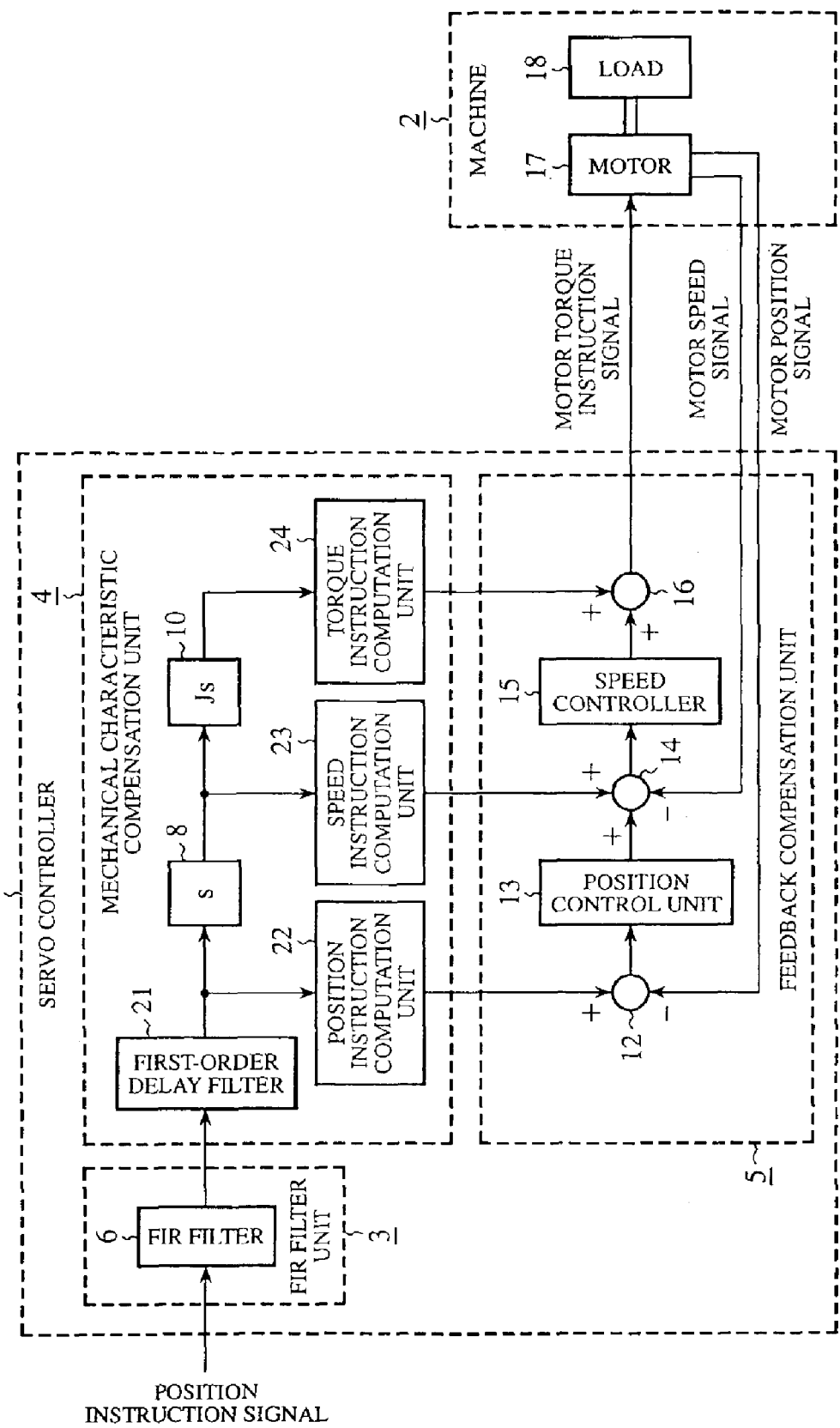
FIG. 5 is a block diagram showing a servo controller in accordance with embodiment 2 of the present invention.

FIG. 5 is a block diagram showing a servo controller in accordance with embodiment 2 of the present invention. In the figure, a first-order delay filter 21 is disposed in a mechanical characteristic compensation unit 4, and has a time constant that is set according to the damping constant, antiresonance frequency, and load inertia of a machine 2 so that the influence of the attenuation characteristics of the machine 2 due to viscous friction is reduced. The first-order delay filter 21 is so constructed as to correct a position instruction signal filtered by an FIR filter unit 3. A position instruction computation unit 22 then attenuates a component having an antiresonance frequency of the machine 2, which is included in the position instruction signal corrected by the first-order delay filter 21, in consideration of the attenuation characteristics of the machine 2 due to viscous friction so as to compute a feed-forward signal associated with the position of the machine. A speed instruction computation unit 23 attenuates a component having an antiresonance frequency of the machine 2, which is included in a value computed by a differentiator 8, in consideration of the attenuation characteristic of the machine 2 due to viscous friction so as to compute a feed-forward signal associated with the speed of the machine. A torque instruction computation unit 24 attenuates a component having a resonance frequency of the machine 2, which is included in a value computed by the computation unit 10, in consideration of the attenuation characteristic of the machine 2 due to viscous friction so as to compute a feed-forward signal associated with the torque of the machine. The servo controller in accordance with embodiment 2 of the present invention has the same structure as that of FIG. 1, except that the mechanical characteristic compensation unit 4 includes the first-order delay filter 21 that is so constructed as to correct the position instruction signal filtered by the FIR filter unit 3, as previously mentioned, and each of the position instruction computation unit 22, speed instruction computation unit 23 and torque instruction computation unit 24 of the mechanical characteristic compensation unit 4 is so constructed as to take the attenuation characteristic of the machine 2 due to viscous friction into consideration.

Next, a description will be made as to the operation of the servo controller in accordance with embodiment 2 of the present invention. In FIG. 5, the servo controller in accordance with embodiment 2 of the present invention differs from that according to above-mentioned embodiment 1 in that after correcting the input signal $x_{r1}$ applied to the mechanical characteristic compensation unit 4, the first-order delay filter 21 delivers the input signal $x_{r1}$ to both the position instruction computation unit 22 and the differentiator 8, and each of the position instruction computation unit 22, speed instruction computation unit 23 and torque instruction computation unit 24 of the mechanical characteristic compensation unit 4 is so constructed as to take the attenuation characteristic of the machine 2 due to viscous friction into consideration. In the servo controller according to above-mentioned embodiment 1, when the influence of the attenuation characteristic of the machine 2 due to the viscous friction of the machine cannot be neglected, there are cases where the influence of the attenuation characteristic of the machine 2 can cause a phase shift between the input signal $x_{r1}$ applied to the mechanical characteristic compensation unit 4 and a load position $x_1$, and the load position $x_1$ cannot be made to properly respond to the input signal $x_{r1}$ applied to the mechanical characteristic compensation unit 4.

The time constant of the first-order delay filter 21 is set so that the phase shift between the input signal $x_{r1}$ applied to the mechanical characteristic compensation unit 4 and the load position $x_1$ is canceled, the phase shift originating from the attenuation characteristic of the machine 2 due to the viscous friction of the machine. The first-order delay filter 21 makes a correction to the input signal $x_{r1}$ applied to the mechanical characteristic compensation unit 4. A relationship between the input signal $x_{r1}$ and output signal $x_{r2}$ of the first-order delay filter 21 is given by the following equation (8):

$$x_{r2}(s) = \frac{1}{1 + 2\frac{\zeta_z}{\omega_z}s} x_{r1}(s) \qquad (8)$$

By using the damping constant c, antiresonance frequency $\omega_z$, and load inertia $J_1$ of the machine 2, $\zeta_z$ is given by the following equation (9):

$$\zeta_z = \frac{c}{2\omega_z J_l} \qquad (9)$$

The position instruction computation unit 22 attenuates a component having an antiresonance frequency $\omega_z$ of the machine 2, which is included in the input signal $x_{r2}$ corrected by the first-order delay filter 21, in consideration of the attenuation characteristic of the machine 2, and outputs the attenuated component. A relationship between the input signal $x_{r2}$ and output signal $x_a$ of the position instruction computation unit 22 is given by the following equation (10):

$$x_a(s) = \left(1 + 2\frac{\zeta_z}{\omega_z}s + \frac{1}{\omega_z^2}s^2\right)x_{r2}(s) \qquad (10)$$

The speed instruction computation unit 23 attenuates a component having an antiresonance frequency $\omega_z$ of the machine 2, which is included in the input signal $v_{r1}$ from the differentiator 8, in consideration of the attenuation characteristic of the machine 2, and outputs the attenuated component. A relationship between the input signal $v_{r1}$ and output signal $v_a$ of the speed instruction computation unit 23 is given by the following equation (11):

$$v_a(s) = \left(1 + 2\frac{\zeta_z}{\omega_z}s + \frac{1}{\omega_z^2}s^2\right)v_{r1}(s) \qquad (11)$$

The torque instruction computation unit 24 attenuates a component having a resonance frequency $\omega_p$ of the machine 2, which is included in the input signal $\tau_{r1}$, in consideration of the attenuation characteristic of the machine 2, and outputs the attenuated component. A relationship between the input signal $\tau_{r1}$ and output signal $\tau_a$ of the torque instruction computation unit 24 is given by the following equation (12):

$$\tau_a(s) = \left(1 + 2\frac{\zeta_p}{\omega_p}s + \frac{1}{\omega_p^2}s^2\right)\tau_{r1}(s) \qquad (12)$$

By using the damping constant c, resonance frequency $\omega_p$, load inertia $J_1$, and motor inertia $J_m$ of the machine, $\zeta_z$ is given by the following equation (13):

$$\zeta_p = \frac{c}{2\omega_p}\left(\frac{1}{J_m} + \frac{1}{J_1}\right) \qquad (13)$$

Even when the machine 2 has attenuation characteristics due to viscous friction or the like, the servo controller constructed as above can make the load position $x_1$ respond completely to the input signal $x_{r1}$ applied to the mechanical characteristic compensation unit 4. This feature can be expressed by the following equation. In other words, when the machine 2 can be approximated as a two-inertia oscillation system and has attenuation characteristics, a relationship between a motor torque instruction signal $\tau_m$ and the motor position $x_m$ is given by the following equation (14):

$$x_m(s) = \frac{1}{Js^2} \frac{1 + 2\frac{\zeta_z}{\omega_z}s + \frac{1}{\omega_z^2}s^2}{1 + 2\frac{\zeta_p}{\omega_p}s + \frac{1}{\omega_p^2}s^2} \tau_m(s) \tag{14}$$

Furthermore, a relationship between the motor position $x_m$ and the load position $x_1$ is given by the following equation (15):

$$x_1(s) = \frac{1 + 2\frac{\zeta_z}{\omega_z}s}{1 + 2\frac{\zeta_z}{\omega_z}s + \frac{1}{\omega_z^2}s^2} x_m(s) \tag{15}$$

Furthermore, a relationship between the motor speed $v_m$ and the motor position $x_m$ and a relationship between an input and an output of a feedback compensation unit 5 are the same as those of the servo controller according to above-mentioned embodiment 1, respectively, and are given by the equations (6) and (7), respectively. When the equations (6) and (7), and (8) to (15) are established, a relationship between the input signal $x_{r1}$ applied to the mechanical characteristic compensation unit 4 of the servo controller according to the embodiment 2 and the position $x_1$ of the load of the machine 2 becomes $x_1 = x_{r1}$. In other words, the load position $x_1$ responds completely to the input signal $x_{r1}$ applied to the mechanical characteristic compensation unit 4. Therefore, the response characteristics of the machine 2 showing a response of the load position with respect to the instructed position is made to agree with the response characteristics of the FIR filter 6, and a response path that is symmetric and excites no vibrations can be acquired.

Figure 6A:
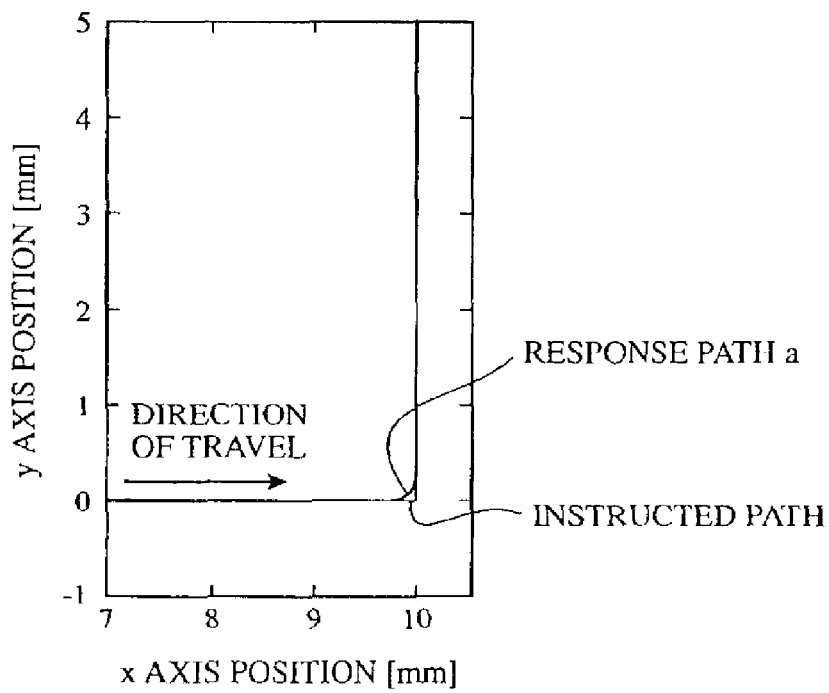
FIG. 6A is a diagram showing an instructed path that is provided for a target machine to be driven by the servo controller in accordance with embodiment 2 of the present invention, and a response path of the target machine to be driven.
Figure 6B:
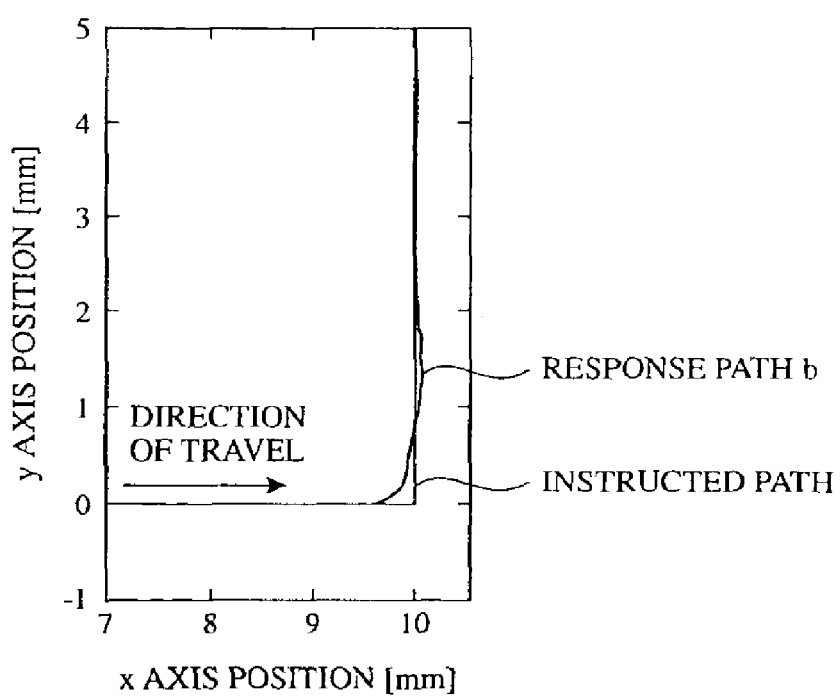
FIG. 6B is a diagram showing an instructed path that is provided for the target machine to be driven by the servo controller according to embodiment 1 and a response path of the target machine to be driven.

Next, advantages provided by the servo controller according to this embodiment 2 will be explained based on results in simulation. FIG. 6A is a diagram showing an instructed path that is provided for the target machine to be driven by the servo controller in accordance with embodiment 2 of the present invention, and a response path of the target machine to be driven. FIG. 6A shows an instructed path and a response path of the machine 2 that is driven by the servo controller according to this embodiment 2, the machine 2 having two degrees of freedom, i.e., two axes (x and y axes) of free motion, and FIG. 6B shows an instructed path that is provided for the machine 2 to be driven by the servo controller according to above-mentioned embodiment 1 and a response path of the machine. In these figures, the instructed path corresponds to the shape of a corner having an angle of 90 degrees, and it is assumed that the resonance frequency $\omega_p$ of the machine 2 is 300 rad/s, and the antiresonance frequency $\omega_z$ of the machine 2 is 200 rad/s. In addition, it is assumed that the attenuation ratio $\zeta_p$ of the machine 2 is 0.2. As can be seen from the example as shown in FIGS. 6A and 6B, when the machine 2 has attenuation characteristics, the servo controller according to this embodiment 2 can further reduce vibrations in the response path, as compared with the case of using the servo controller according to above-mentioned embodiment 1.

As mentioned above, according to this embodiment 2, each of the position instruction computation unit 22, speed instruction computation unit 23, and torque instruction computation unit 24 of, the mechanical characteristic compensation unit 4 attenuates a component having an antiresonance or resonance frequency of the machine 2 in consideration of the attenuation characteristics of the machine 2 due to the viscous friction of the machine, and the first-order delay filter 21 has a time constant that is set so that the phase shift between the input signal $x_{r1}$ applied to the mechanical characteristic compensation unit 4 and the load position $x_1$ is canceled, the phase shift originating from the attenuation characteristic of the machine 2 due to the viscous friction of the machine, and is so constructed as to make a correction to the input signal $x_{r1}$ applied to the mechanical characteristic compensation unit 4. Therefore, even when the machine 2 can be assumed to be a two-inertia oscillation system and the machine 2 has attenuation characteristics due to the viscous friction thereof, the servo controller in accordance with embodiment 2 of the present invention can make the machine position, i.e., the load position completely respond to the input of the mechanical characteristic compensation unit 4, i.e., the output of the FIR filter unit 3 without exciting mechanical vibrations.

Embodiment 3.

Figure 7:
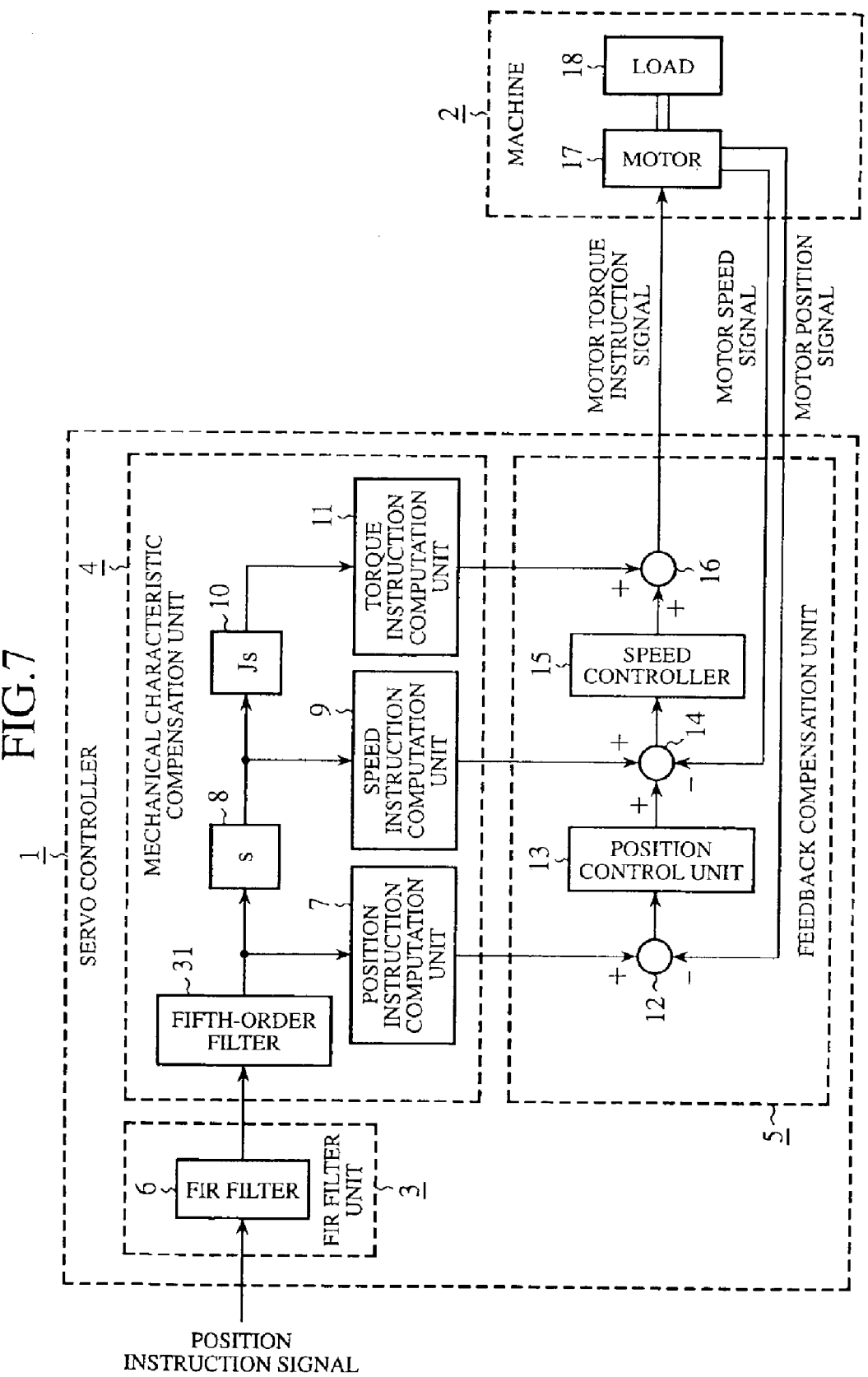
FIG. 7 is a block diagram showing a servo controller in accordance with embodiment 3 of the present invention.

FIG. 7 is a block diagram showing a servo controller in accordance with embodiment 3 of the present invention. As shown in the figure, a fifth-order IIR filter (or an nth-order filter) 31 is disposed in a mechanical characteristic compensation unit 4. The fifth-order IIR filter has a property of cutting off desired frequencies and corrects a position instruction signal passing through an FIR filter unit. The servo controller in accordance with embodiment 3 of the present invention has the same structure as that of FIG. 1, except that the mechanical characteristic compensation unit 4 includes the fifth-order filter 31 that is so constructed as to correct the position instruction signal filtered by the FIR filter unit 3.

Next, a description will be made as to the operation of the servo controller in accordance with embodiment 3 of the present invention. In FIG. 7, the servo controller in accordance with embodiment 3 of the present invention differs from that according to above-mentioned embodiment 1 in that after correcting the input signal $x_{r1}$ applied to the mechanical characteristic compensation unit 4 by using the fifth-order IIR filter 31, the mechanical characteristic compensation unit 4 delivers the corrected input signal to both a position instruction computation unit 7 and a differentiator 8. It can be assumed that the fifth-order IIR filter 31 has a structure shown by the following equation (16):

$$x_{r2}(s) = \frac{1}{\left(1 + \frac{1}{K_1}s\right)\left(1 + \frac{1}{K_2}s\right)\left(1 + \frac{1}{K_3}s\right)\left(1 + \frac{1}{K_4}s\right)\left(1 + \frac{1}{K_5}s\right)} x_{r1}(s) \tag{16}$$

where $K_1$ to $K_5$ are parameters showing poles that determine the frequency cutoff characteristics of the fifth-order IIR filter 31.

Figure 8:
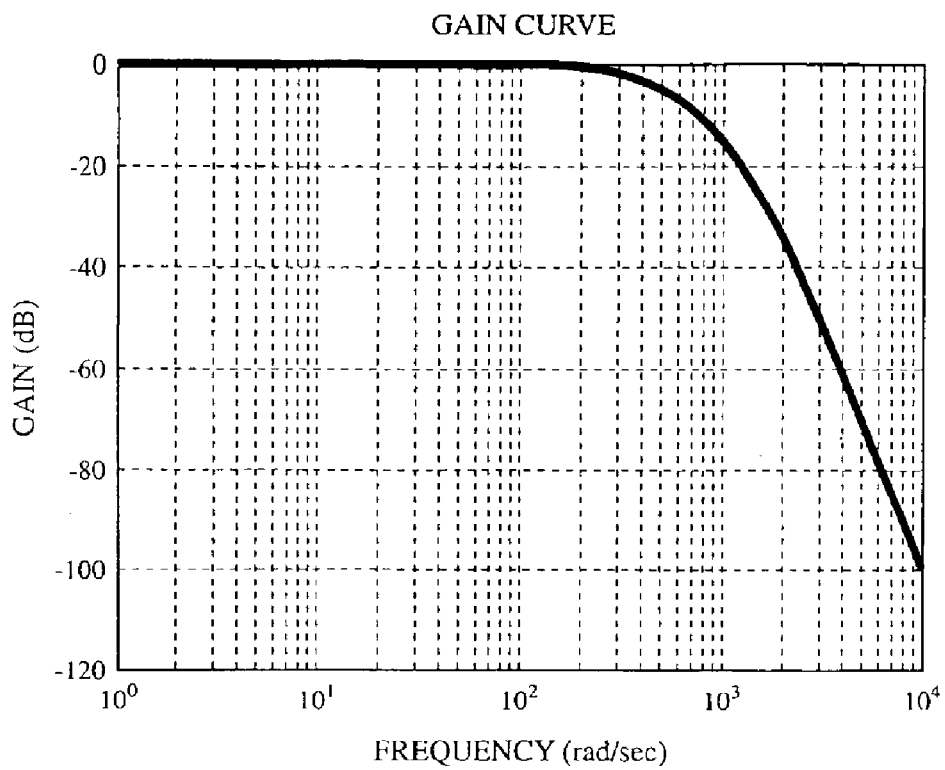
FIG. 8 is a diagram showing an example of a gain curve of a fifth-order IIR filter.

FIG. 8 is a diagram showing an example of a gain curve of the fifth-order IIR filter. The example of FIG. 8 shows the gain curve of the fifth-order IIR filter 31 at $K_1 = K_2 = K_3 = K_4 = K_5 = 1000$. It is apparent from this figure that components of frequencies higher than about 400 rad/s are cut off by the fifth-order IIR filter.

According to the servo controller having such a structure, even when the machine 2 cannot be approximated as a two-inertia oscillation system and another resonance point exists in a frequency region that is higher than the resonance frequency $\omega_p$ of the machine, because components of frequencies that are close to the other resonance point are cut off by the fifth-order IIR filter 31, vibrations in the response path can be reduced. Furthermore, even when the position instruction signal contains noise of high frequency and hence vibrations are caused in the response path, because components of high frequencies included in the position instruction signal are cut off by the fifth-order IIR filter 31, vibrations in the response path can be reduced.

Figure 9A:
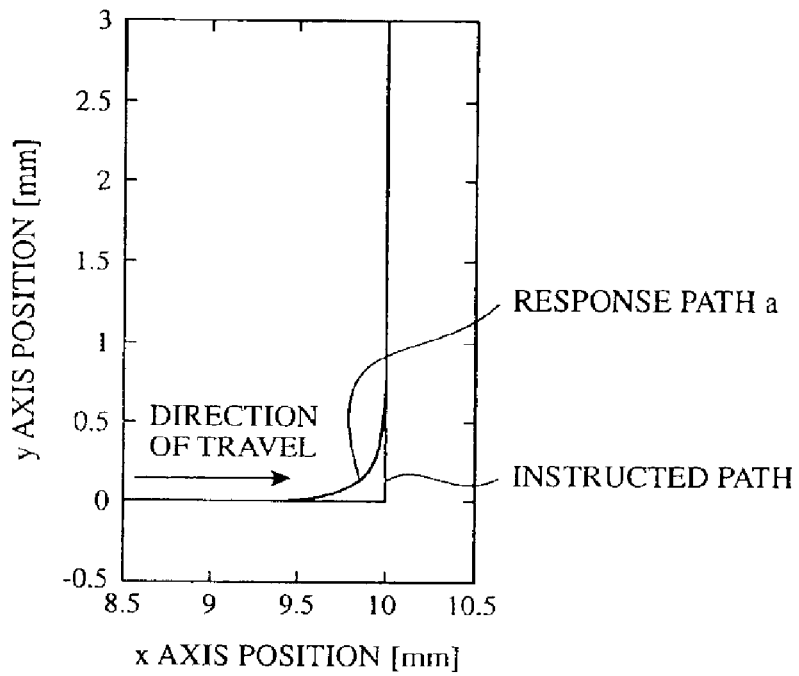
FIG. 9A is a diagram showing an instructed path that is provided for a target machine to be driven by the servo controller in accordance with embodiment 3 of the present invention, and a response path of the target machine to be driven.
Figure 9B:
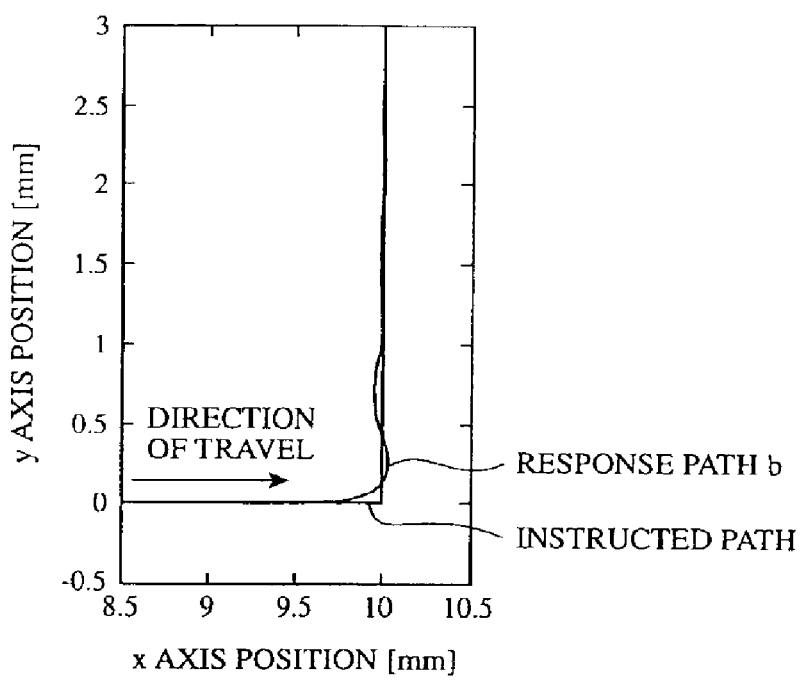
FIG. 9B is a diagram showing an instructed path that is provided for the target machine to be driven by the servo controller according to embodiment 1 and a response path of the target machine to be driven.

Next, advantages provided by the servo controller according to this embodiment 3 will be explained based on results in simulation. FIG. 9A is a diagram showing an instructed path that is provided for the target machine to be driven by the servo controller in accordance with embodiment 3 of the present invention, and a response path of the target machine to be driven. FIG. 9A shows an instructed path and a response path of the machine 2 that is driven by the servo controller according to this embodiment 3, the machine having two degrees of freedom, i.e., two axes (x and y axes) of free motion, and FIG. 9B shows an instructed path that is provided for the machine 2 to be driven by the servo controller according to above-mentioned embodiment 1 and a response path of the machine. In these figures, the instructed path corresponds to the shape of a corner having an angle of 90 degrees, and it is assumed that the resonance frequency $\omega_p$ of the machine 2 is 300 rad/s, and the antiresonance frequency $\omega_z$ of the machine 2 is 200 rad/s. In addition, it is assumed that the machine 2 has a second resonance frequency of 1000 rad/s, and a second antiresonance frequency of 700 rad/s. As can be seen from the example as shown in FIGS. 9A and 9B, when the machine 2 cannot be approximated as a two-inertia oscillation system and has both a second resonance frequency and a second antiresonance frequency, the servo controller according to this embodiment 3 can further reduce vibrations in the response path, as compared with the case of using the servo controller according to above-mentioned embodiment 1.

As mentioned above, according to this embodiment 3, because the mechanical characteristic compensation unit 4 is provided with the fifth-order IIR filter 31 that has a property of cutting off desired frequencies and corrects the input position instruction signal, when noise of high frequency is included in the position instruction signal and when another resonance point and another antiresonance point exist in a frequency region that is higher than the resonance frequency and antiresonance frequency of the machine 2, which are parameters of the mechanical characteristic compensation unit 4, the bad influence upon the response path can be reduced. In accordance with this embodiment 3, the fifth-order IIR filter 31 having five desired poles is disposed in the mechanical characteristic compensation unit 4. As an alternative, a first or higher-order IIR filter can be disposed in the mechanical characteristic compensation unit 4.
Embodiment 4.

Figure 10:
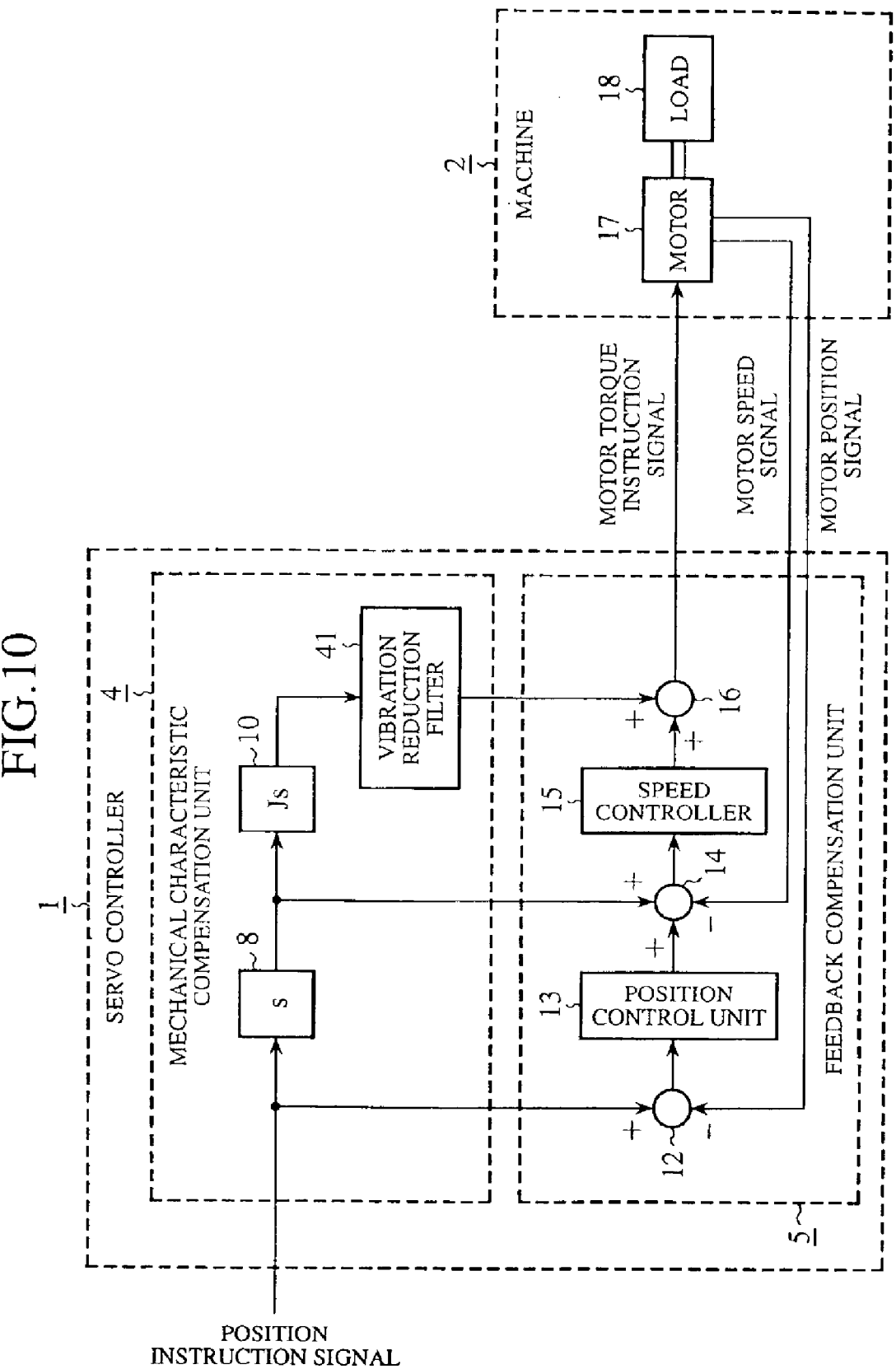
FIG. 10 is a block diagram showing a servo controller in accordance with embodiment 4 of the present invention.

FIG. 10 is a block diagram showing a servo controller in accordance with embodiment 4 of the present invention. In the figure, the servo controller delivers a position instruction signal directly applied to a mechanical characteristic compensation unit 4 to a subtractor 12 as a feed-forward signal associated with the position of a machine 2, a differentiator 8 differentiates the input position instruction signal so as to compute a feed-forward signal associated with the speed of the machine 2 and then delivers it to an adder/subtractor 14, a computation unit 10 further differentiates the differentiated position instruction signal computed by the differentiator 8 and multiplies the differentiated result by a total inertia of the machine 2, and a vibration reduction filter 41 attenuates a component having a resonance frequency of the machine 2 included in the value computed by the computation unit 10 and amplifies a component having an antiresonance frequency of the machine 2 included in the value computed by the computation unit 10 so as to compute a feed-forward signal associated with the torque of the machine 2, and delivers it to an adder 16. The servo controller in accordance with embodiment 4 of the present invention has the same structure as that of FIG. 1, except that the mechanical characteristic compensation unit 4 is constructed as above.

Next, a description will be made as to the operation of the servo controller in accordance with embodiment 4 of the present invention. In FIG. 10, the position instruction signal $x_r$ directly applied to the mechanical characteristic compensation unit 4 is delivered to a feedback compensation unit 5 as the feed-forward signal $x_a$ associated with the position of the machine. Furthermore, the position instruction signal is differentiated by the differentiator 8 and is then delivered to the feedback compensation unit 5 as the feed-forward signal $v_a$ associated with the speed of the machine. In addition, after the differentiated signal computed by the differentiator 8 is further differentiated by the computation unit 10 and is then multiplied by the total inertia of the machine 2, the multiplication result is delivered to the vibration reduction filter 41, and the output signal of the vibration reduction filter 41 is delivered to the feedback control unit 5 as the feed-forward signal $\tau_a$ associated with the torque of the machine. The structures and operations of the feedback compensation unit 5 and the machine 2 are the same to those according to above-mentioned embodiment 1.

Next, the operation of the vibration reduction filter 41 will be explained. It is assumed that a relationship between the input signal $\tau r1$ applied to the vibration reduction filter 41 and the output signal $\tau_a$ of the vibration reduction filter 41 is given by the following equation (17) by using the resonance frequency $\omega_p$ and antiresonance frequency $\omega_z$ of the machine 2.

$$\tau_a(s) = \frac{1 + \frac{1}{\omega_p^2}s^2}{1 + \frac{1}{\omega_z^2}s^2} \tau_{rl}(s) \quad (17)$$

The vibration reduction filter 41 thus attenuates the component having the resonance frequency of the machine 2, which is included in the value computed by the computation unit 10, and amplifies the component having the antiresonance frequency of the machine 2, which is included in the value computed by the computation unit 10.

The servo controller according to this embodiment having such a simple structure can reduce mechanical vibrations. Furthermore, when the machine 2 has high stiffness between a motor 17 and a load 18 thereof and low stiffness between the motor 17 and a motor mounting base on which the motor is mounted, and mechanical vibrations occur because of resonance and antiresonance that occur between the motor 17 and the motor mounting base, vibrating components that originate from the resonance and antiresonance that occur between the motor 17 and the motor mounting base are removed by the vibration reduction filter 41 and the load position $x_1$ completely responds to the position instruction signal $x_r$. This feature can be expressed by the following equation. In other words, when the machine 2 can be approximated as a model having sufficiently-high stiffness between the motor 17 and the load 18 and low stiffness between the motor 17 and the motor mounting base, a relationship between a motor torque instruction signal $\tau_m$ and a motor position $x_m$ is given by the following equation (18):

$$x_m(s) = \frac{1}{Js^2} \frac{1 + \frac{1}{\omega_z^2}s^2}{1 + \frac{1}{\omega_p^2}s^2} \tau_m(s) \qquad (18)$$

Furthermore, a relationship between the motor position $x_m$ and a load position $x_1$ is given by the following equation (19):

$$x_1(s) = x_m(s) \qquad (19)$$

Furthermore, a relationship between a motor speed $v_m$ and the motor position $x_m$ and a relationship between the input and output of the feedback compensation unit 5 are the same as those of the servo controller according to above-mentioned embodiment 1, and are given by the equations (6) and (7), respectively. When the equations (6) and (7), and (17) to (19) are established, a relationship between the input position instruction signal $x_r$ applied to the mechanical characteristic compensation unit 4 of the servo controller according to the embodiment 4 and the position $x_1$ of the load of the machine 2 becomes $x_1 = x_r$. In other words, the load position $x_1$ responds completely to the input position instruction signal $x_r$. Therefore, mechanical vibrations can be effectively reduced.

Figure 11:
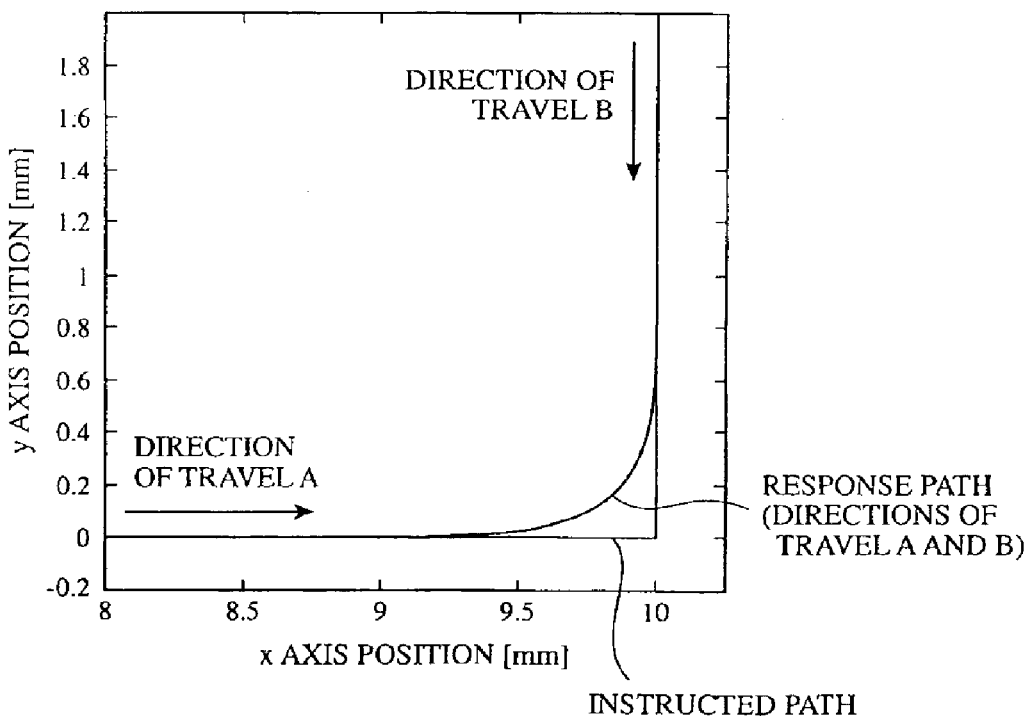
FIG. 11 is a diagram showing an instructed path that is provided for a target machine to be driven by the servo controller in accordance with embodiment 4 of the present invention, and a response path of the target machine to be driven.

Next, advantages provided by the servo controller according to this embodiment 4 will be explained based on results in simulation. FIG. 11 is a diagram showing an instructed path that is provided for the target machine to be driven by the servo controller in accordance with embodiment 4 of the present invention, and a response path of the target machine to be driven. FIG. 11 shows an instructed path and a response path of the machine 2 that is driven by the servo controller according to this embodiment 4, the machine having two degrees of freedom, i.e., two axes (x and y axes) of free motion. In the figure, the instructed path corresponds to the shape of a corner having an angle of 90 degrees, and the response path is provided when the target to be driven is made to move between two positions and in two directions of travel A and B along the same path. Furthermore, it is assumed that the machine 2 has sufficiently-high stiffness between the motor 17 and the load 18 thereof and low stiffness between the motor 17 and the motor mounting base on which the motor is mounted, and that the resonance frequency $\omega_p$ of the machine 2 is 300 rad/s and the antiresonance frequency $\omega_z$ of the machine 2 is 200 rad/s. As can be seen from the example as shown in FIG. 11, even when the machine 2 has low stiffness between the motor 17 and the motor mounting base thereof, the servo controller according to this embodiment 4 can further reduce vibrations in the response path and the difference between the two response paths of the round trip, as compared with the case of using prior art servo controllers.

As mentioned above, according to this embodiment 4, because the vibration reduction filter 41 attenuates the component having the resonance frequency of the machine 2, which is included in the value computed by the computation unit 10, and amplifies the component having the antiresonance frequency of the machine 2, which is included in the value computed by the computation unit 10, so as to compute the feed-forward signal associated with the torque of the machine, the servo controller can produce the effect of reducing vibrations with a simpler structure than that of the servo controller according to above-mentioned embodiment 1. Particularly, when vibrations occur because of low stiffness between the motor 17 and the motor mounting base of the machine 2, vibrations in the machine 2 can be reduced.

Embodiment 5.

Figure 12:
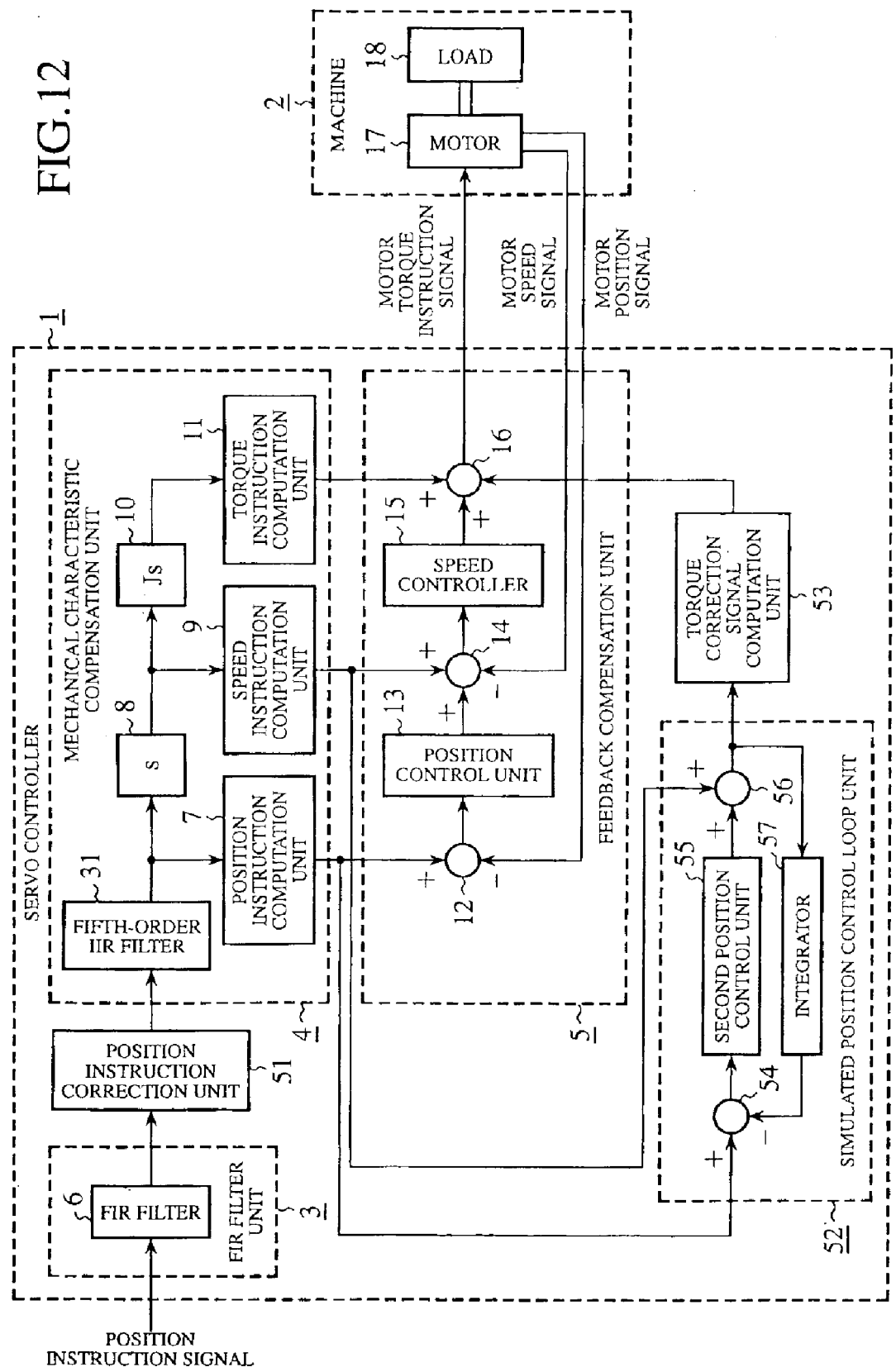
FIG. 12 is a block diagram showing a servo controller in accordance with embodiment 5 of the present invention.
Figure 13:
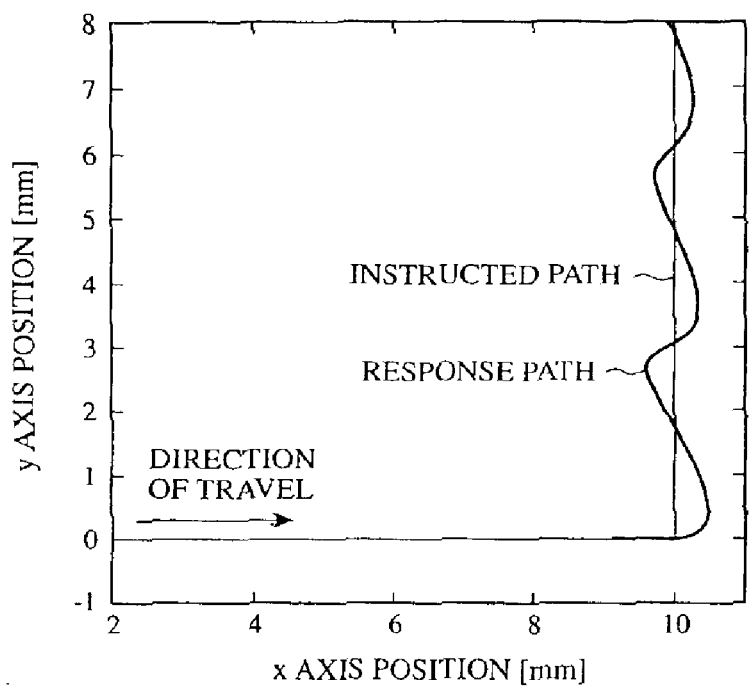
FIG. 13 is a diagram showing an instructed path that is provided for a target machine to be driven by a prior art servo controller, and a response path of the target machine to be driven.
Figure 14:
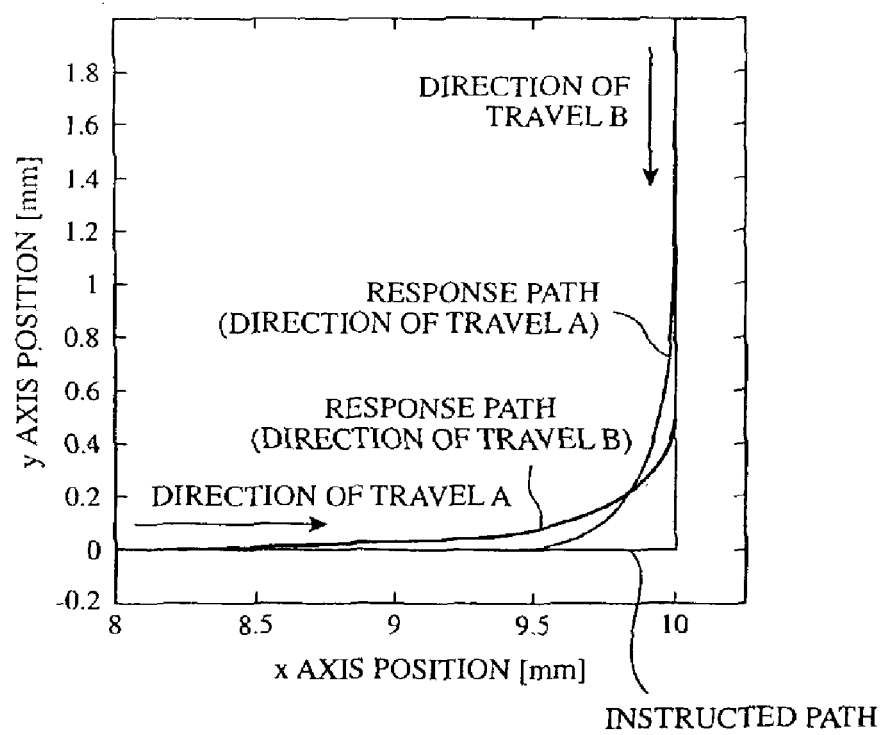
FIG. 14 is a diagram showing an instructed path that is provided for a target machine to be driven by another prior art servo controller, and a response path of the target machine to be driven.

FIG. 12 is a block diagram showing a servo controller in accordance with embodiment 5 of the present invention. In the figure, a position instruction correction unit 51 is disposed between an FIR filter unit 3 and a mechanical characteristic compensation unit 4. The position instruction correction unit 51 has a property of reducing the influence of an FIR filter 6 and a fifth-order IIR filter 31 upon decrease in their gains in a range of frequencies lower than the cutoff frequencies of these filters, and corrects a position instruction signal passing through the FIR filter 6.

A simulated position control loop unit 52 performs a simulation of a feedback compensation unit 5 based on both a feed-forward signal associated with the position of a machine and a feed-forward signal associated with the speed of the machine so as to compute a simulated speed signal. A torque correction signal computation unit 53 computes a torque correction signal according to a change in the sign of the simulated speed signal, and then delivers the torque correction signal to an adder 16 of the feedback compensation unit 5. In the simulated position control loop unit 52, a subtractor 54 subtracts a simulated position signal from the feed-forward signal associated with the position of the machine and then delivers the subtraction result to a second position control unit 55, the second position control unit 55 performs the same computation as done by a position control unit 13, which is explained in embodiment 1, and then delivers the computation result to an adder 56, the adder 56 adds the output of the second position control unit 55 to the feed-forward signal associated with the speed of the machine so as to obtain the simulated speed signal, and an integrator 57 integrates the simulated speed signal so as to obtain the simulated position signal. The servo controller in accordance with embodiment 5 of the present invention has the same structure as that of FIG. 7, except that the servo controller further includes the position instruction correction unit 51, the simulated position control loop unit 52, and the torque correction signal computation unit 53.

Next, a description will be made as to the operation of the servo controller in accordance with embodiment 5 of the present invention. As shown in FIG. 12, the servo controller in accordance with embodiment 5 of the present invention differs from that according to above-mentioned embodiment 3 in that after correcting the output signal of the FIR filter unit 3, the position instruction correction unit 51 delivers it to the mechanical characteristic compensation unit 4, the simulated position control loop unit 52 obtains the simulated speed signal from both the feed-forward signal associated with the position of machine and the feed-forward signal associated with the speed of the machine, which are delivered thereto from the mechanical characteristic compensation unit 4, and the torque correction signal computation unit 53 computes the torque correction signal from the simulated speed signal delivered thereto and then delivers it to the adder 16 so as to cause the adder 16 to add the torque correction signal to the motor torque instruction signal.

The FIR filter 6 and the fifth-order IIR filter 31 smooth the input position instruction signal so as to prevent the signals input to the feedback compensation unit 5 from becoming large impulses, thereby preventing a bad influence from being exerted upon the machine 2. Those filters can also reduce vibrations in the response path by cutting off components having high frequencies included in the position instruction signal. However, because those filters are both low pass filters, their gains decrease as the frequency of the input increases. The gains of those filters can also decrease a little even in a low frequency region of frequencies lower than the cutoff frequency, and this results in the radius of the response path becoming smaller than the radius of the instructed path when the instructed path includes an arc. Therefore, the position instruction correction unit 51 corrects the input position instruction signal so that the influence of the FIR filter 6 and the fifth-order IIR filter 31 upon decrease in their gains is reduced. A relationship between the input signal $x_{r1}$ applied to the position instruction correction unit 51 and an output signal $x_{r11}$ from the position instruction correction unit 51 is given by the following equation (20):

$$x_{r11}(s) = (1 + \alpha \cdot s) x_{r1} \tag{20}$$

where $\alpha$ is a parameter used for increasing or decreasing the amount of correction and is set so that the decrease in the gains in the low frequency range from the frequency of the position instruction signal $x_r$ to the frequency of the output $x_{r2}$ of the fifth-order IIR filter 31 becomes below a desired value.

Furthermore, in a case where a friction force is exerted on the motor 17, when the direction of rotation of the motor 17 is reversed, a time delay can occur in the tracking of the output of the FIR filter unit 3 by the position of the machine 2 and this results in the occurrence of a difference between the instructed path and the response path. In this case, by providing a correction instruction for correcting the torque instruction signal when the sign of the motor speed changes, a time delay can be prevented from occurring in the tracking of the output of the FIR filter unit 3 by the position of the machine 2. However, in accordance with the method of providing the correction instruction when the sign of the motor speed signal changes, even when the sign of the motor speed signal changes due to small turbulence applied to the motor 17 or the load 18 while the motor 17 is stopped, the direction of rotation of the motor 17 can be assumed to be reversed and therefore the correction instruction is undesirably provided.

In contrast, the simulated position control loop unit 52 performs a simulation of the feedback compensation unit 5 based on both the feed-forward signal associated with the position of the machine and the feed-forward signal associated with the speed of the machine so as to compute a simulated speed signal, and then delivers it to the torque correction signal computation unit 53. In the simulated position control loop unit 52, the subtractor 54 subtracts the simulated position signal from the feed-forward signal associated with the position of the machine and delivers the subtraction result to the second position control unit 55. The second position control unit 55 performs the same computation as done by the position control unit 13, which is explained in embodiment 1, and then delivers the computation result to the adder 56, the adder 56 adds the output of the second position control unit 55 to the feed-forward signal associated with the speed of the machine so as to obtain the simulated speed signal, and the integrator 57 integrates the simulated speed signal so as to obtain the simulated position signal. The torque correction signal computation unit 53 computes the torque correction signal according to a change in the sign of the simulated speed signal, and then delivers it to the adder 16. The torque correction signal has a value that is predetermined according to a change in the torque of the motor 17 when the direction of rotation of the motor 17 is reversed, which is measured in advance.

As mentioned above, according to this embodiment 5, because the decrease in the gains in a low frequency range of the FIR filter 6 and the fifth-order IIR filter 31 caused by themselves is compensated for by the position instruction correction unit 51, when the instructed path contains an arc, the radius of the response path never becomes smaller than the radius of the instructed path and the difference between the instructed path and the response path can be reduced. Furthermore, because the simulated position control loop unit 52 computes the simulated speed signal from both the feed-forward signal associated with the position of the machine and the feed-forward signal associated with the speed of the machine and the torque correction signal computation unit 53 computes the torque correction signal according to a change in the sign of the simulated speed signal and then adds the torque correction signal to the motor torque instruction signal, a time delay can be prevented from occurring in the tracking of the output of the FIR filter unit 3 by the position of the machine 2 and the difference between the instructed path and the response path can be reduced.

In accordance with this embodiment 5, the servo controller is further provided with the position instruction correction unit 51, the simulated position control loop unit 52, and the torque correction signal computation unit 53 in addition to the structure of the servo controller according to embodiment 3, as previously explained. As an alternative, the servo controller can be further provided with only the position instruction correction unit 51 or only the simulated position control loop unit 52 and the torque correction signal computation unit 53 of the above-mentioned additional components.

In addition, in accordance with this embodiment 5, the position instruction correction unit 51 is disposed between the FIR filter unit 3 and the mechanical characteristic compensating unit 4, as previously explained. As an alternative, the position instruction correction unit 51 can be disposed at the front of the FIR filter unit 3 or at the rear of the mechanical characteristic compensating unit 4.

Furthermore, in accordance with this embodiment 5, the servo controller adds the torque correction signal to the motor torque instruction signal, as previously explained. As an alternative, the servo controller can add the torque correction signal to the feed-forward signal associated with the torque of the machine. In this case, when the speed control unit 15 is a controller that carries out proportion and integration control, the servo controller can alternatively add the torque correction signal to an integrated item obtained by the speed control unit 15.

In addition, in accordance with any one of the above-mentioned embodiments, the feedback compensation unit 5 receives the plurality of feed-forward signals respectively associated with the position, speed, and torque of the machine, as previously explained. As an alternative, the feedback compensation unit 5 can receive a feed-forward signal associated with the acceleration of the machine, instead of the feed-forward signal associated with the torque of the machine. In this case, the computation unit 10 according to any one of above-mentioned embodiments can be replaced by a computation unit that only differentiates the differentiated result obtained by the differentiator 8. This variant can provide the same advantage. As an alternative, the feedback compensation unit 5 can receive a feed-forward signal associated with an electric current flowing in the machine, instead of the feed-forward signal associated with the torque of the machine. In this case, the computation unit 10 according to any one of above-mentioned embodiments can be replaced by a computation unit that multiplies the differentiated result obtained by the differentiator 8 by a value that is obtained by dividing the total inertia of the machine 2 by the torque constant of the motor 17, instead of the total inertia of the machine 2. This variant can provide the same advantage.

Furthermore, in accordance with any one of the above-mentioned embodiments, the motor 17 is of rotation type to generate a torque, as previously explained. As an alternative, the motor 17 can be of linear type to generate thrust. In this case, in any one of above-mentioned embodiments, inertia can be replaced by mass and torque can be replaced by thrust. This variant can provide the same advantage.

As previously explained, the servo controller in accordance with the present invention is applied to the position control of the target machine. As an alternative, the servo controller in accordance with the present invention can be applied to the speed control of the target machine. When the servo controller in accordance with the present invention is applied to the speed control of the target machine, there is no necessity to provide the feedback loop associated with the position of the target machine and the feed-forward signal associated with the position of the target machine. This variant can provide the same advantage.

In addition, in accordance with any one of the above-mentioned embodiments, the position instruction operation unit, the speed instruction operation unit, and the torque instruction operation unit can multiply the plurality of feed-forward signals respectively associated with the position, speed, torque of the target machine by either a dead time caused by discreting or an adjustment factor used for making an adjustment for a slight model error of the target to be controlled, respectively. As an alternative, the differentiator 8 and the computation unit 10 can multiply their respective computed values by a similar adjustment factor.

Furthermore, in accordance with any one of the above-mentioned embodiments, the components of the mechanical characteristic compensating unit 4 are arranged in different order as long as the mechanical characteristic compensating unit 4 has the same transfer function from its input to its output. For example, the feed-forward signal $v_a$ associated with the speed of the target machine can be determined by differentiating the feed-forward signal $x_a$ associated with the position of the target machine. In addition, in any one of the above-mentioned embodiments, differentiation can be replaced by pseudo-differentiation (multiplying the difference between the immediately-preceding value and the current value by a reciprocal of the sampling period so as to compute an approximate derivative).

In addition, in accordance with any one of the above-mentioned embodiments 1 to 3, the FIR filter unit 3 and the mechanical characteristic compensating unit 4 can change places. In other words, the position instruction signal is directly applied to the mechanical characteristic compensating unit 4 and the outputs of the mechanical characteristic compensating unit 4 are then input to the FIR filter unit 3. The FIR filter unit 3 finally generates the plurality of feed-forward signals respectively associated with the position, speed, and torque of the target machine from the outputs of the mechanical characteristic compensating unit 4.

Many widely different embodiments of the present invention may be constructed without departing from the spirit and scope of the present invention. It should be understood that the present invention is not limited to the specific embodiments described in the specification, except as defined in the appended claims.

What is claimed is:

1. A servo controller comprising:
    a finite impulse response (FIR) filter unit for correcting a position instruction signal;
    a mechanical characteristic compensation unit for attenuating components, each component having a predetermined frequency and corresponding to a characteristic of a target machine to be driven, and which are included in the position instruction signal corrected by said FIR filter unit, and computing a plurality of feed-forward signals respectively associated with position, speed, and torque of the target machine; and
    a feedback compensation unit for driving the target machine according to the plurality of feed-forward signals respectively associated with the position, the speed, and the torque of the target machine and computed by said mechanical characteristic compensation unit.

2. The servo controller according to claim 1, wherein said mechanical characteristic compensation unit comprises
    a position instruction computation unit for attenuating a component having an antiresonance frequency of the target machine, and which is included in the position instruction signal, and computing the feed-forward signal associated with the position of the target machine,
    a differentiator for differentiating the position instruction signal,
    a speed instruction computation unit for attenuating a component having the antiresonance frequency of the target machine, and which is included in a value computed by said differentiator, and computing the feed-forward signal associated with the speed of the target machine,
    a computation unit for differentiating the value computed by said differentiator to produce a differentiated value, and for multiplying the differentiated value by total inertia of the target machine, and
    a torque instruction computation unit for attenuating a component having a resonance frequency of the target machine, and which is included in a value computed by said computation unit, and computing the feed-forward signal associated with the torque of said target machine.

3. The servo controller according to claim 1, wherein said mechanical characteristic compensation unit comprises
    a first-order delay filter for correcting the position instruction signal, said first-order delay filter having a time constant according to a damping constant, an antiresonance frequency, and inertia of a load of the target machine so that influence of attenuation characteristics of the target machine is reduced,
    a position instruction computation unit for attenuating a component having the antiresonance frequency of the target machine and which is included in the position instruction signal corrected by said first-order delay filter, in consideration of the attenuation characteristics of the target machine, and computing the feed-forward signal associated with the position of the target machine
    a differentiator for differentiating the position instruction signal corrected by said first-order delay filter,
    a speed instruction computation unit for attenuating a component having the antiresonance frequency of the target machine and which is included in the position instruction signal differentiated by said differentiator, in consideration of the attenuation characteristics of the target machine, and computing the feed-forward signal associated with the speed of the target machine,
    a computation unit for differentiating a value computed by said differentiator to produce a differentiated value, and for multiplying the differentiated value by a total inertia of the target machine, and a torque instruction computation unit for attenuating a component having a resonance frequency of the target machine, and which is included in a value computed by said computation unit, in consideration of the attenuation characteristics of the target machine, and computing the feed-forward signal associated with the torque of the target machine.

4. The servo controller according to claim 1, wherein said FIR filter unit includes at least two moving average filters, each moving average filter having a time constant based on requested path accuracy.

5. The servo controller according to claim 1, wherein said mechanical characteristic compensation unit comprises an nth-order filter (n is an arbitrary natural number) for correcting the position instruction signal, said nth-order filter cutting off a component having a desired frequency.

6. The servo controller according to claim 1, further comprising a position instruction correction unit for correcting the position instruction signal so that influence of said FIR filter unit upon gain of said FIR filter unit itself is reduced.

7. The servo controller according to claim 6, wherein said position instruction correction unit corrects the position instruction signal by adding to the position instruction signal a value, that is obtained by multiplying the position instruction signal, after differentiation, by a coefficient.

8. The servo controller according to claim 1, further comprising a simulated position control loop unit for computing a simulated speed signal according to both the feed-forward signal associated with the position of the target machine and the feed-forward signal associated with the speed of the target machine, which are computed by said mechanical characteristic compensation unit, and a torque correction signal computation unit for computing a torque correction signal according to a change in sign of the simulated speed signal computed by said simulated position control loop unit when direction of rotation of the target machine is reversed, and for correcting the feed-forward signal associated with the torque of said target machine, which is computed by said mechanical characteristic compensation unit, according to the torque correction signal.

9. A servo controller comprising:

a differentiator for differentiating a position instruction signal to compute a feed-forward signal associated with speed of a target machine to be driven;

a computation unit for differentiating a value computed by said differentiator to produce a differentiated value, and for multiplying the differentiated value by total inertia of the target machine;

a vibration reduction filter for attenuating a component having a resonance frequency of the target machine, and which is included in a value computed by said computation unit, and for amplifying a component having an antiresonance frequency of the target machine, and which is included in the value computed by said computation unit, and computing a feed-forward signal associated with torque of the target machine; and a feedback compensation unit for driving the target machine according to the position instruction signal, the feed-forward signal associated with the speed of the target machine and computed by said differentiator, and the feed-forward signal associated with the torque of the target machine and computed by said vibration reduction filter.

10. The servo controller according to claim 9, further comprising a position instruction correction unit for correcting the position instruction signal so that influence of said differentiator upon a gain of said differentiator itself is reduced.

11. The servo controller according to claim 10, wherein said position instruction correction unit corrects the position instruction signal by adding to the position instruction signal a value, that is obtained by multiplying the differentiated position instruction signal by a coefficient.

12. The servo controller according to claim 9, further comprising a simulated position control loop unit for computing a simulated speed signal according to both the feed-forward signal associated with the position of the target machine and the feed-forward signal associated with the speed of the target machine, and which are computed by said mechanical characteristic compensation unit, and a torque correction signal computation unit for computing a torque correction signal according to a change in sign of the simulated speed signal computed by said simulated position control loop unit when direction of rotation of the target machine is reversed, and for correcting the feed-forward signal associated with the torque of said target machine, and which is computed by said mechanical characteristic compensation unit, according to the torque correction signal.

* * * * *